(12) United States Patent
Ju et al.

(10) Patent No.: US 12,183,936 B2
(45) Date of Patent: Dec. 31, 2024

(54) BATTERY PACK AND VEHICLE COMPRISING SAME BATTERY PACK

(71) Applicant: LG CHEM, LTD., Seoul (KR)

(72) Inventors: Eun-Ah Ju, Daejeon (KR); Dal-Mo Kang, Daejeon (KR); Jeong-O Mun, Daejeon (KR); Sung-Won Seo, Daejeon (KR); Yoon-Koo Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 974 days.

(21) Appl. No.: 17/260,751

(22) PCT Filed: Nov. 7, 2019

(86) PCT No.: PCT/KR2019/015088
§ 371 (c)(1),
(2) Date: Jan. 15, 2021

(87) PCT Pub. No.: WO2020/130346
PCT Pub. Date: Jun. 25, 2020

(65) Prior Publication Data
US 2021/0296727 A1     Sep. 23, 2021

(30) Foreign Application Priority Data

Dec. 18, 2018   (KR) .......................... 10-2018-0164610

(51) Int. Cl.
*H01M 50/209*     (2021.01)
*B60L 50/60*      (2019.01)
(Continued)

(52) U.S. Cl.
CPC .......... *H01M 50/209* (2021.01); *B60L 50/66* (2019.02); *H01M 50/105* (2021.01);
(Continued)

(58) Field of Classification Search
CPC .......... H01M 2220/20; H01M 50/209; H01M 50/211; H01M 50/244; H01M 50/258; B60L 50/60–66
See application file for complete search history.

(56) References Cited

U.S. PATENT DOCUMENTS 8,592,069 B1    11/2013   Anderson et al.
2005/0260488 A1  11/2005  Zhou et al.
(Continued)

FOREIGN PATENT DOCUMENTS

CN    103723020 A    4/2014
CN    206201948 U    5/2017
(Continued)

OTHER PUBLICATIONS

Wang, CN207876455 U, EPO machine translation, 2018 (Year: 2018).*

(Continued)

*Primary Examiner* — Haroon S. Sheikh
*Assistant Examiner* — Kan Luo
(74) *Attorney, Agent, or Firm* — Birch, Stewart, Kolasch & Birch, LLP

(57) ABSTRACT

Discussed is a battery pack including: a battery module assembly including a plurality of battery modules including a plurality of battery cells; a pack tray on which the battery module assembly is accommodated; and a tray bar arranged on at least one side edge of the pack tray.

13 Claims, 5 Drawing Sheets

(51) Int. Cl.
  *H01M 50/105* (2021.01)
  *H01M 50/211* (2021.01)
  *H01M 50/244* (2021.01)
  *H01M 50/258* (2021.01)
  *H01M 50/289* (2021.01)

(52) U.S. Cl.
  CPC ....... *H01M 50/211* (2021.01); *H01M 50/244* (2021.01); *H01M 50/258* (2021.01); *H01M 50/289* (2021.01); *H01M 2220/20* (2013.01)

(56) References Cited

U.S. PATENT DOCUMENTS

| | | |
|---|---|---|
| 2011/0151311 A1 | 6/2011 | Lee et al. |
| 2012/0070716 A1 | 3/2012 | Yoshioka et al. |
| 2012/0312614 A1 | 12/2012 | Fujiwara et al. |
| 2013/0288094 A1 | 10/2013 | Noh et al. |
| 2013/0288105 A1 | 10/2013 | Niedzwiecki et al. |
| 2014/0087234 A1 | 3/2014 | Lent et al. |
| 2014/0186677 A1 | 7/2014 | Lim |
| 2015/0255764 A1 | 9/2015 | Loo et al. |
| 2018/0013110 A1 | 1/2018 | Wuensche et al. |
| 2018/0138477 A1 | 5/2018 | Handning et al. |
| 2018/0287227 A1 | 10/2018 | Jeong et al. |
| 2018/0294503 A1 | 10/2018 | Hoefler et al. |
| 2018/0337374 A1* | 11/2018 | Matecki et al. ........ H01M 2/10 |
| 2019/0190096 A1 | 6/2019 | Shen et al. |
| 2020/0067156 A1 | 2/2020 | Chi et al. |

FOREIGN PATENT DOCUMENTS

| | | |
|---|---|---|
| CN | 108063197 A | 5/2018 |
| CN | 108370009 A | 8/2018 |
| CN | 207876455 U | 9/2018 |
| JP | 2004-171856 A | 6/2004 |
| JP | 2011-134554 A | 7/2011 |
| JP | 2012-256468 A | 12/2012 |
| JP | 5342541 B2 | 11/2013 |
| JP | 2014-107241 A | 6/2014 |
| JP | 5592341 B2 | 9/2014 |
| JP | 2015-125824 A | 7/2015 |
| JP | 2015-529389 A | 10/2015 |
| JP | 2017-98135 A | 6/2017 |
| JP | 6304587 B2 | 4/2018 |
| JP | 2018-97983 A | 6/2018 |
| JP | 2018-110048 A | 7/2018 |
| KR | 10-2012-0030014 A | 3/2012 |
| KR | 10-2013-0122323 A | 11/2013 |
| KR | 10-1669118 B1 | 10/2016 |
| KR | 10-2018-0006257 A | 1/2018 |
| KR | 10-2018-0110969 A | 10/2018 |
| WO | WO 2018/186566 A1 | 10/2018 |

OTHER PUBLICATIONS

Extended European Search Report for Application No. 19899079.8 dated Oct. 11, 2021.
International Search Report (PCT/ISA/210) issued in PCT/KR2019/015088, dated Feb. 21, 2020.

* cited by examiner

BATTERY PACK AND VEHICLE COMPRISING SAME BATTERY PACK

TECHNICAL FIELD

The present disclosure relates to a battery pack and a vehicle including the battery pack.

The present application claims priority to Korean Patent Application No. 10-2018-0164610 filed on Dec. 18, 2018 in the Republic of Korea, the disclosures of which are incorporated herein by reference.

BACKGROUND ART

Secondary batteries having high application ability and electric characteristics, such as high energy density and the like, according to product groups are generally applied not only to portable devices, but also electric vehicles (EVs) or hybrid electric vehicles (HEVs) driven by electric driving sources. Such secondary batteries are attracting attention as new energy sources for enhancing environmental-friendliness and energy efficiency, not only due to a primary advantage of significantly reducing the use of fossil fuel, but also in that no by-products are generated by the use of energy.

Types of the secondary batteries currently widely used include lithium ion batteries, lithium polymer batteries, nickel cadmium batteries, nickel hydrogen batteries, and nickel zinc batteries. An operating voltage of such a unit secondary battery cell, i.e., a unit battery cell, is about 2.5 V to 4.5 V. Thus, when a higher output voltage is required, a battery pack may be configured by connecting a plurality of battery cells in series. Also, the battery pack may be configured by connecting the plurality of battery cells in parallel based on charging and discharging capacity required for the battery pack. Accordingly, the number of battery cells included in the battery pack may be variously set based on a required output voltage or charging and discharging capacity.

Meanwhile, when the battery pack is configured by connecting the plurality of battery cells in series/parallel, it is common to first configure a battery module including at least one battery cell, and then configure the battery pack by adding other components by using the at least one battery module.

A conventional battery pack is generally configured by including a battery module assembly including battery modules including a plurality of battery cells, and a pack tray on which such a battery module assembly is accommodated. Such a conventional battery pack is generally equipped with a plurality of separately provided crush beams for impact absorption or the like, between the battery modules. Also, the conventional pack tray is provided with a predetermined gap space between the battery modules and the crush beams in consideration of mounting tolerance when the battery modules and the crush beams are mounted.

However, in the case of the conventional battery pack, there is a disadvantage in terms of energy density due to a gap space generated by the mounting of such separate crush beams. When such separate crush beams are omitted, there is a disadvantage in terms of securing rigidity.

Thus, there is a demand for seeking ways to provide a battery pack capable of securing rigidity and improving energy density at the same time, and a vehicle including such a battery pack.

DISCLOSURE

Technical Problem

Accordingly, the present disclosure is directed to providing a battery pack capable of securing rigidity and improving energy density at the same time, and a vehicle including the battery pack.

Technical Solution

In one aspect of the present disclosure, there is provided a battery pack including: a battery module assembly including a plurality of battery modules including a plurality of battery cells; a pack tray on which the battery module assembly is accommodated; and a tray bar arranged on at least one side edge of the pack tray.

The tray bar may include a plurality of the tray bars provided to face battery modules at both outermost sides of the battery module assembly, and wherein the battery pack may further include a plurality of tolerance compensation members provided between the battery modules at both outermost sides of the battery module assembly and the plurality of tray bars.

The plurality of tolerance compensation members may be forcibly fitted between the battery modules at both outermost sides of the battery module assembly and the plurality of battery bars.

Each of the plurality of tray bars may include: a bar main body supported on the pack tray; a first support portion bent from the bar main body and for supporting the plurality of tolerance compensation members; and a second support portion arranged between a bottom of the bar main body and the first support portion to support a bottom portion of the first support portion.

Each of the plurality of tolerance compensation members may include: a shim part arranged in contact with the battery modules at both outermost sides of the battery module assembly and the plurality of tray bars; and an accommodating part bent from an upper end of the shim part and accommodated on an upper side of the plurality of tray bars.

Each of the plurality of tolerance compensation members may include a protruding part protruding from the accommodating part towards the plurality of tray bars.

The second support portion may include a plurality of combining grooves into which the protruding part is inserted.

The plurality of battery modules of the battery module assembly may be arranged in close contact with each other inside the pack tray.

Each of the plurality of battery cells may be provided as a pouch type secondary battery, and wherein the plurality of battery cells of each of the plurality of battery modules may be arranged in close contact with each other.

Also, in another aspect of the present disclosure, there is provided a vehicle including at least one battery pack according to above embodiments.

Advantageous Effects

According to the various embodiments, a battery pack capable of securing rigidity and improving energy density at the same time, and a vehicle including the battery pack may be provided.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

MODE FOR DISCLOSURE

The present disclosure will become more apparent by describing preferred embodiments of the present disclosure in detail with reference to the accompanying drawings. Embodiments described herein are exemplarily shown in order to facilitate understanding of the disclosure, and it should be understood that the present disclosure may be variously modified differently from the embodiments described herein. In addition, in order to facilitate understanding of the disclosure, the accompanying drawings may not be drawn in actual scale, but the dimensions of some components may be exaggerated.

Figure 1:
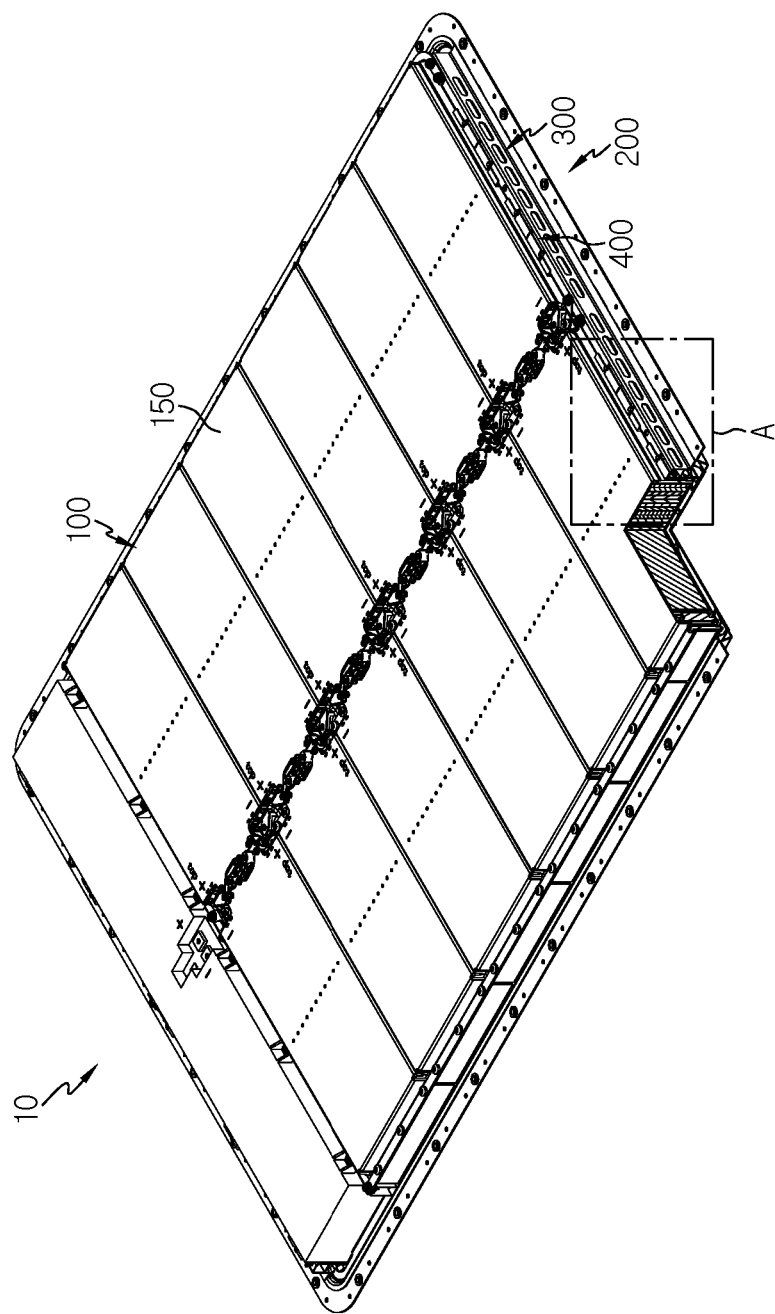
FIG. 1 is a partial cutaway view for describing a battery pack according to an embodiment of the present disclosure.
Figure 2:
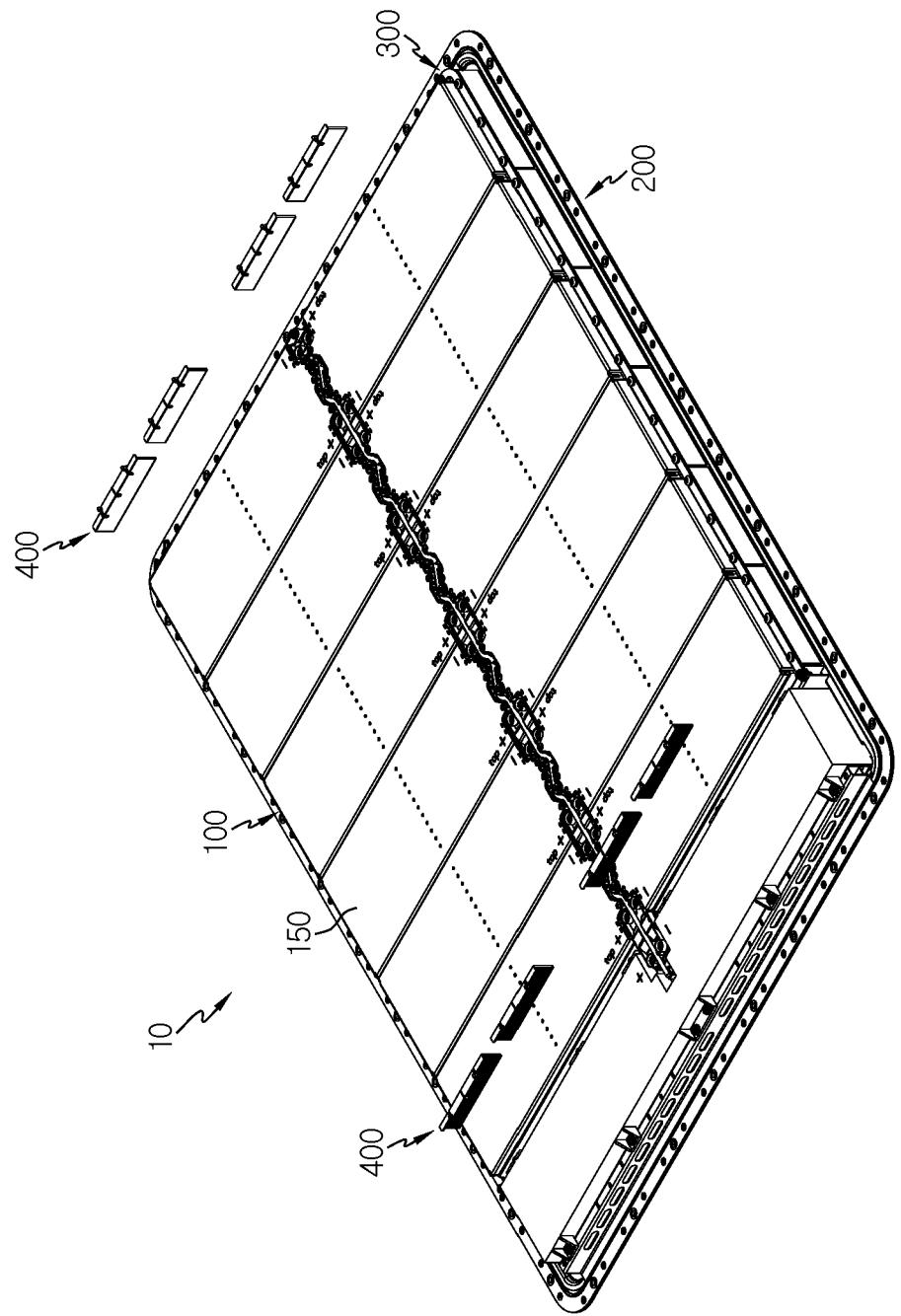
FIGS. 2 through 4 are views for describing tolerance compensation member of the battery pack of FIG. 1.
Figure 3:
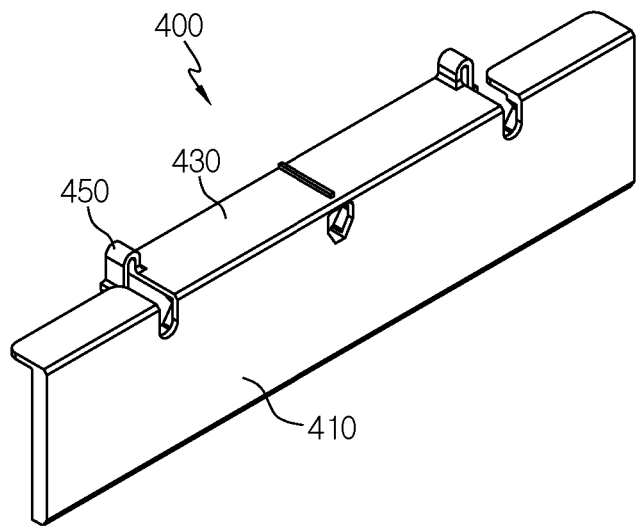
Figure 4:
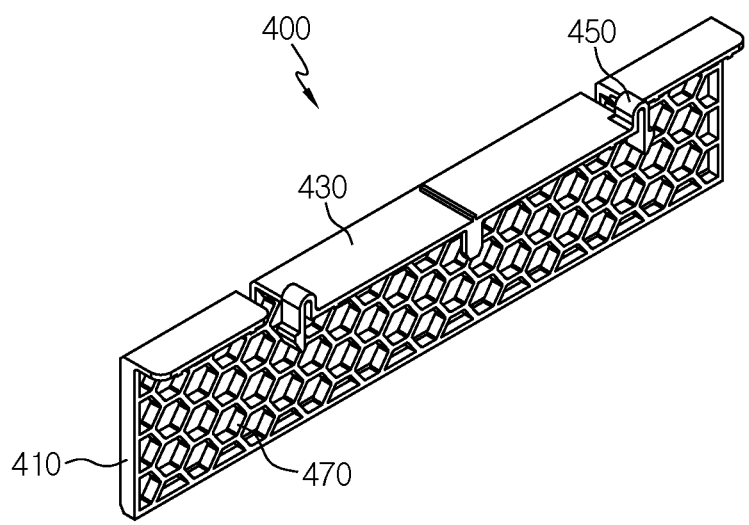
Figure 5:
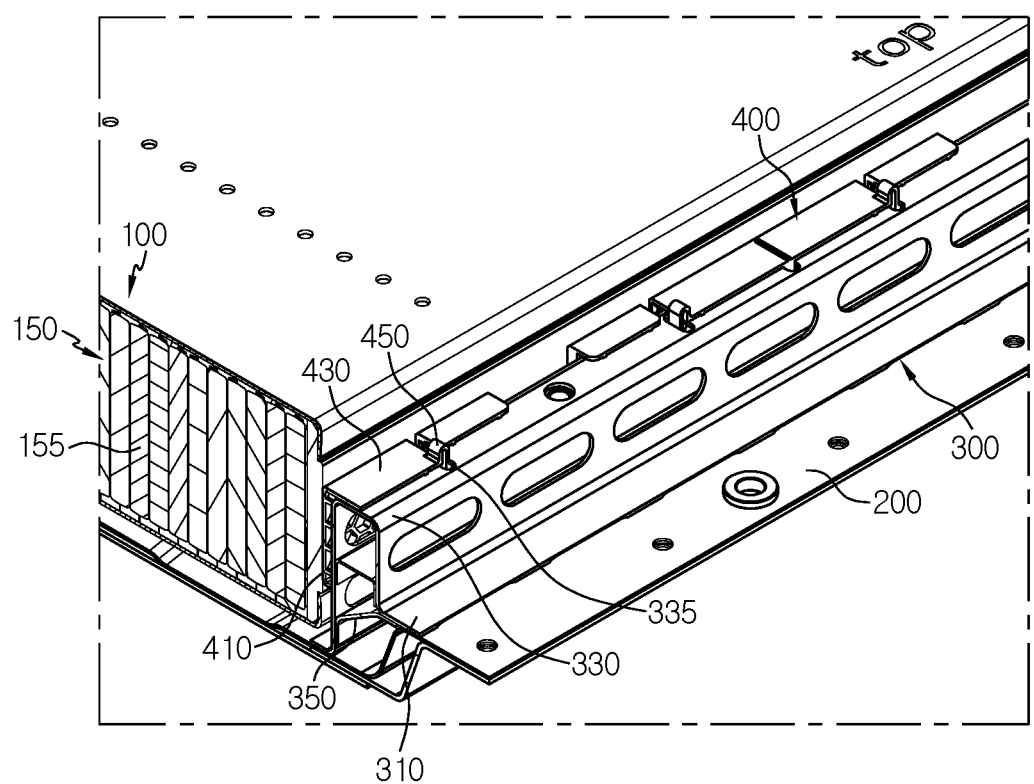
FIG. 5 is an enlarged view of a portion A of FIG. 1.
Figure 6:
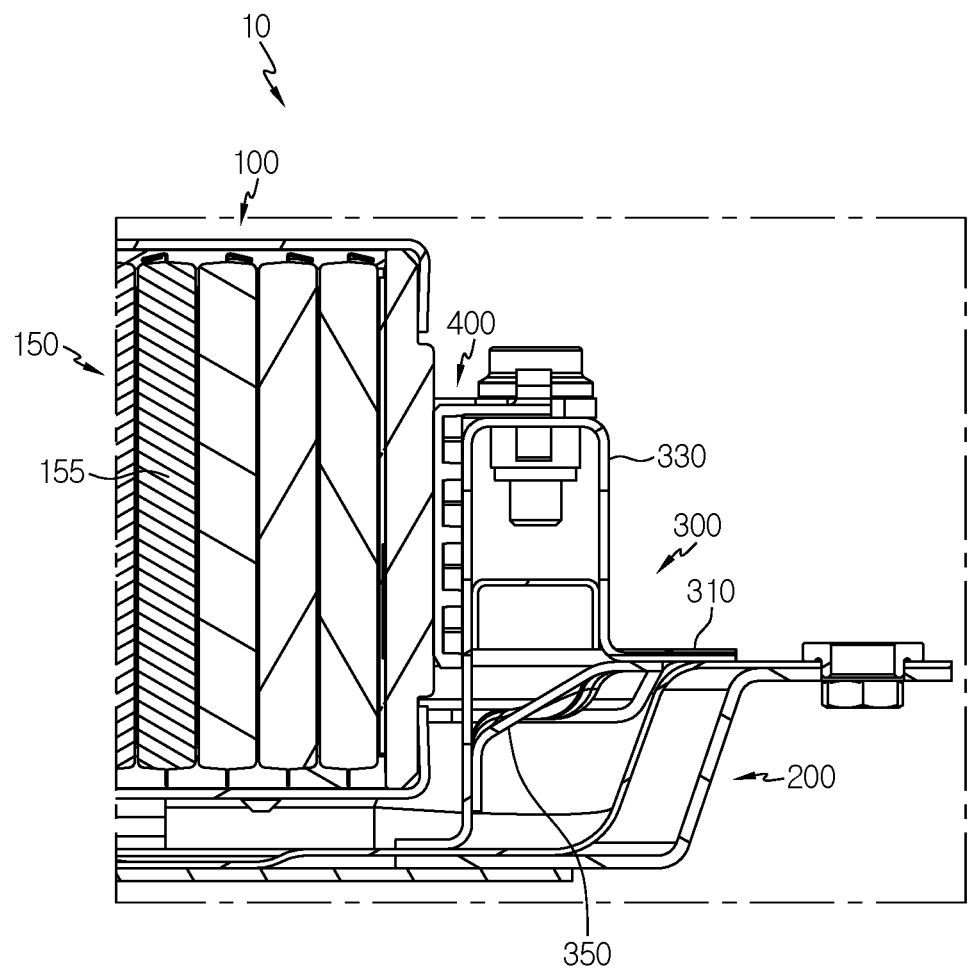
FIG. 6 is a cross-sectional view of a main portion of the battery pack of FIG. 1.

FIG. 1 is a partial cutaway view for describing a battery pack according to an embodiment of the present disclosure, FIGS. 2 through 4 are views for describing tolerance compensation member of the battery pack of FIG. 1, FIG. 5 is an enlarged view of a portion A of FIG. 1, and FIG. 6 is a cross-sectional view of a main portion of the battery pack of FIG. 1.

Referring to FIGS. 1 through 6, a battery pack 10 may include a battery module assembly 100, a pack tray 200, a tray bar 300, and a tolerance compensation member 400.

The battery module assembly 100 may include a plurality of battery modules 150 including a plurality of battery cells 155.

The plurality of battery modules 150 of the battery module assembly 100 may be arranged in close contact with each other inside the pack tray 200 described later. In other words, according to the current embodiment, the plurality of battery modules 150 may be arranged in close contact with each other without having to insert a separate member between the plurality of battery modules 150. Accordingly, in the current embodiment, energy density of the battery module assembly 100 mounted on the pack tray 200 described later may be significantly improved.

The plurality of battery cells 155 are secondary batteries, and may include at least one of a pouch type secondary battery, a cylindrical secondary battery, and an angled secondary battery. Hereinafter, in the current embodiment, the plurality of battery cells 155 will be described as being pouch type secondary batteries.

The plurality of battery cells 155 may be arranged in close contact with each other inside the each battery module 150. Accordingly, in the current embodiment, the energy density of the battery module 150 may be significantly improved.

The battery module assembly 100 may be accommodated in the pack tray 200. In this regard, the pack tray 200 may be provided with an accommodating space where the battery module assembly 100 may be accommodated. Such a pack tray 200 may be mounted on a vehicle 1 described later.

The tray bar 300 may be arranged on at least one side edge of the pack tray 200. Such a tray bar 300 may protect the battery module assembly 100 from an external impact or the like, and in addition, reinforce the rigidity of the battery pack 10.

There may be a plurality of the tray bars 300. The plurality of tray bars 300 may be arranged to face the battery modules 150 at both outermost sides of the battery module assembly 100.

Such a plurality of tray bars 300 may each include a bar main body 310, a first support portion 330, and a second support portion 350.

The bar main body 310 may be arranged on at least one side edge of the pack tray 200. Such a bar main body 310 is supported on the pack tray 200 and may be formed to have a predetermined length.

The first support portion 330 is bent from the bar main body 310, supports the plurality of tolerance compensation members 400, and may be bent from the bar main body 310. Such a first support portion 330 may include a plurality of combining grooves 335 into which protruding parts 450 of the plurality of tolerance compensation members 400 described later are inserted.

The second support portion 350 may be arranged between the bottom of the bar main body 310 and the bottom of the first support portion 330 to support a bottom portion of the first support portion 330.

The tolerance compensation member 400 is for offsetting a cumulative tolerance at both end portions of the battery module assembly 100, which may occur when the plurality of battery modules 150 are closely arranged, and a mounting tolerance between the battery modules 150 and the tray bar 300, and may be provided in plural.

The plurality of tolerance compensation members 400 may be provided between the plurality of tray bars 300 and the battery modules 150 at both outermost sides of the battery module assembly 100.

The plurality of tolerance compensation members 400 may be forcibly fitted between the plurality of tray bars 300 and the battery modules 150 at both outermost sides of the battery module assembly 100.

Such a plurality of tolerance compensation members 400 may each include a shim part 410, an accommodating part 430, the protruding part 450, and a rigidity rib 470.

The shim part 410 may be arranged in contact with the plurality of tray bars 300 and the battery modules 150 at both outermost sides of the battery module assembly 100. Here, one surface of the shim part 410 may be flat to be in surface-contact with the battery modules 150.

The accommodating part 430 is bent from an upper end of the shim part 410 and may be accommodated at an upper side of the plurality of tray bars 300, in particular, in the first support portion 330 of the plurality of tray bars 300.

The protruding part 450 protrudes from the accommodating part 430 towards the plurality of tray bars 300 and may be inserted into the combining groove 335 of the first support portion 330 of the plurality of tray bars 300.

The rigidity rib 470 is for reinforcing the self-rigidity of the shim part 410 and may be formed on the other surface of the shim part 410, i.e., on one surface facing the plurality of tray bars 300.

As such, the battery pack 10 according to the current embodiment may secure the rigidity of the battery pack 10 and at the same time, effectively prevent an impact transmitted to the battery module assembly 100 due to an external impact or the like, via the tray bar 300 and the tolerance compensation member 400, without having to use a structure of separate crush beams provided between the battery modules 150 as in the related art.

Moreover, in the current embodiment, because the separate crush beams between the battery modules 150 may be omitted, the entire energy density of the battery pack 10 may be significantly improved.

Figure 7:
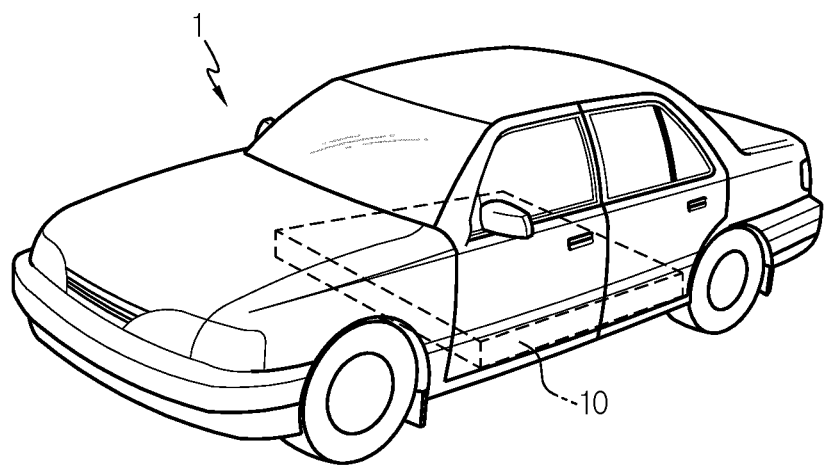
FIG. 7 is a view for describing a vehicle according to an embodiment of the present disclosure.

FIG. 7 is a view for describing a vehicle according to an embodiment of the present disclosure.

Referring to FIG. 7, the battery pack 10 is a fuel source of the vehicle 1 and may be included in the vehicle 1. For example, the battery pack 10 may be included in an electric vehicle, a hybrid vehicle, and other types of vehicles 1 capable of using the battery pack 10 as a fuel source.

Also, the battery pack 10 may also be provided in other apparatuses, equipments, and facilities, such as an energy storage system using a secondary battery, in addition to the vehicle 1.

As such, the apparatus, equipment, and facility including the battery pack 10, such as the vehicle 1 according to the current embodiment, includes the battery pack 10 described above, and thus the apparatus, equipment, and facility, such as the vehicle 1, having all advantages of the battery pack 10 described above may be implemented.

According to the various embodiments described above, the battery pack 10 capable of securing the rigidity and at the same time improving the energy density, and the vehicle 1 including such a battery pack 10 may be provided.

While the preferred embodiments of the present disclosure have been shown and described, the present disclosure is not limited to the specific embodiments described above. Various modifications may be made by one of ordinary skill in the art without departing from the gist of the present disclosure as claimed in the claims, and these modifications should not be individually understood from the technical ideas or prospects of the present disclosure.

What is claimed is:

1. A battery pack comprising:
   a battery module assembly comprising a plurality of battery modules including a plurality of battery cells;
   a pack tray on which the battery module assembly is accommodated;
   a tray bar arranged on at least one side edge of the pack tray, wherein the tray bar comprises a plurality of tray bars provided to face the plurality of battery modules at opposite outermost sides of the battery module assembly; and
   a plurality of tolerance compensation members having rigidity ribs and provided between the plurality of battery modules at the opposite outermost sides of the battery module assembly and the plurality of tray bars, wherein each of the plurality of tolerance compensation members comprises:
   a shim part arranged in contact with the plurality of battery modules at the opposite outermost sides of the battery module assembly and the plurality of tray bars; and
   an accommodating part bent from an upper end of the shim part and accommodated on an upper side of the plurality of tray bars.

2. The battery pack of claim 1, wherein the plurality of tolerance compensation members are forcibly fitted between the plurality of battery modules at the opposite outermost sides of the battery module assembly and the plurality of tray bars.

3. The battery pack of claim 1, wherein each of the plurality of tray bars comprises:
   a bar main body supported on the pack tray;
   a first support portion bent from the bar main body and configured to support the plurality of tolerance compensation members; and
   a second support portion arranged between a bottom of the bar main body and the first support portion to support a bottom portion of the first support portion.

4. The battery pack of claim 1, wherein each of the plurality of tolerance compensation members comprises a protruding part protruding from the accommodating part towards the plurality of tray bars.

5. The battery pack of claim 4, wherein the protruding part includes a curved portion that extends away from the accommodating part.

6. The battery pack of claim 4, wherein the first support portion comprises a plurality of combining grooves into which the protruding part of each of the plurality of tolerance compensation members is inserted.

7. The battery pack of claim 6, wherein the plurality of combining grooves extends in a direction that intersects an extending direction of the bar main body.

8. The battery pack of claim 1, wherein the plurality of battery modules of the battery module assembly are arranged in close contact with each other inside the pack tray.

9. The battery pack of claim 1, wherein each of the plurality of battery cells is provided as a pouch type secondary battery, and
   wherein the plurality of battery cells of each of the plurality of battery modules are arranged in close contact with each other.

10. A vehicle comprising at least one battery pack according to claim 1.

11. The battery pack of claim 1, wherein the plurality of tolerance compensation members are provided only between the plurality of battery modules and the plurality of tray bars.

12. The battery pack of claim 1, wherein the battery pack lacks crush beams between the plurality of battery modules.

13. The battery pack of claim 1, wherein the rigidity ribs are formed on one surface of each tolerance compensation member facing a corresponding one of the plurality of tray bars.

* * * * *